US007669787B2

(12) United States Patent
Kelly

(10) Patent No.: US 7,669,787 B2
(45) Date of Patent: Mar. 2, 2010

(54) WASH WAND COMBINATION FOR DISPENSING FLUID AND AIR

(75) Inventor: Travis Jermaine Kelly, Shelby Township, MI (US)

(73) Assignee: Travis J. Kelly, Clinton Township, MI (US)

( * ) Notice: Subject to any disclaimer, the term of this patent is extended or adjusted under 35 U.S.C. 154(b) by 247 days.

(21) Appl. No.: 11/601,958

(22) Filed: Nov. 20, 2006

(65) Prior Publication Data

US 2008/0116293 A1 May 22, 2008

Related U.S. Application Data

(60) Provisional application No. 60/597,293, filed on Nov. 21, 2005.

(51) Int. Cl.
*B05B 7/30* (2006.01)
*B05B 7/10* (2006.01)

(52) U.S. Cl. ............... 239/351; 239/311; 239/398; 239/402.5; 239/407; 239/527; 239/532; 239/289

(58) Field of Classification Search ............ 239/289, 239/311, 372, 351, 398, 402.5, 407, 412, 239/525–532
See application file for complete search history.

(56) References Cited

U.S. PATENT DOCUMENTS

| 1,605,185 | A | * | 11/1926 | Heinrich | 239/412 |
| 3,690,556 | A | * | 9/1972 | McCain | 239/112 |
| 4,904,654 | A | * | 2/1990 | Lin et al. | 514/220 |
| 4,928,883 | A | * | 5/1990 | Weinstein | 239/223 |
| 6,000,637 | A | * | 12/1999 | Duncan | 239/526 |
| 6,455,017 | B1 | * | 9/2002 | Kasting et al. | 422/292 |
| 7,360,720 | B2 | * | 4/2008 | Gohring et al. | 239/351 |

FOREIGN PATENT DOCUMENTS

JP 05231618 A * 9/1993

* cited by examiner

*Primary Examiner*—Len Tran
*Assistant Examiner*—James S Hogan

(57) ABSTRACT

The present invention teaches a car wash wand having a fan mounted thereon which allows the wash wand user to blow the vehicle dry using the same lightweight hand carried device used to wash the car. The fan may be powered by the pressurized water flowing through the wash wand, which may be diverted to a turbine chamber to power the turbine, which in turn provides mechanical power to turn the fan. The wash wand may also have selection devices allowing at least two modes of operation: water coming out versus air coming out, and optionally a third mode of operation in which nothing comes out.

7 Claims, 4 Drawing Sheets

WASH WAND COMBINATION FOR DISPENSING FLUID AND AIR

CROSS-REFERENCE TO RELATED APPLICATIONS

The application is related to U.S. Provisional Patent Application No. 60/597,293 filed Nov. 21, 2005 in the name of the same inventor, Travis Kelly, and entitled COMBINATION WASH WAND DEVICE FOR DISPENSING FLUID AND AIR and claims the priority and benefit of that earlier application, the entire disclosure of which is incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD OF THE INVENTION

This invention relates generally to hand carried car washing devices, and specifically to wands for hand washing cars.

STATEMENT REGARDING FEDERALLY FUNDED RESEARCH

This invention was not made under contract with an agency of the US Government, nor by any agency of the US Government.

BACKGROUND OF THE INVENTION

Hand car washes allow users great flexibility in washing their cars. Whereas automated car washes lack hand carried wands, have large and quite expensive installations and may damage custom equipment on vehicles that pass through them, hand car washes have a hand carried wand and nozzle which allows a user to leave their vehicle, pick up the wand, and direct a jet of high pressure water at their car manually. This allows user to avoid delicate areas of the car, and allows the user to focus on particularly dirty areas.

The typical hand car wash wand is simply an elongated nozzle with a pistol grip for convenient use. Some may have a shut-off valve allowing the user to halt or reduce water flow, and some may allow the user to dispense soap.

However, hand car washes do not offer the ability to dry the vehicle conveniently. In general, the user of a hand car wash is expected to drive the wet vehicle away and allow it air dry in the wind of its own motion. However, this had notable disadvantages, in particular, the wet moving vehicle accumulates dust as it goes, defeating the purpose of the car wash.

An entirely different technology is the installation type car wash in which the user drives into an automated or human-occupied bay and the car is washed either by people or by mechanical devices. Such mechanical devices are quite expensive and must of necessity be larger than the vehicle to be washed. Because the automated bays are so large, it is possible to provide massive blowing machinery to dry the vehicle as it exits.

However, many vehicles must be hand washed by the owner and thus cannot go through automated bays. Vehicles with holes in the top that would allow water in, vehicles with special exterior equipment and so on all must be washed by the owner or another person, and this means use of the normal car wash wand.

Thus it would be advantageous to provide a hand carried car wash wand which may be used for drying a vehicle being washed, in whole or in part.

SUMMARY OF THE INVENTION

General Summary

The present invention teaches a car wash wand having a fan mounted thereon which allows the wash wand user to blow the vehicle dry using the same lightweight hand carried device used to wash the car. The fan may be powered by the pressurized water flowing through the wash wand, which may be diverted to a turbine chamber to power the turbine, which in turn provides mechanical power to turn the fan. The wash wand may also have selection devices allowing at least two modes of operation: water coming out versus air coming out, and optionally a third mode of operation in which nothing comes out.

In more detail, the device has a body which includes a handle arranged for convenient gripping by the user and having a weight light enough to be hand carried. A pair of liquid conduits for liquid import and export allow water to flow into the wand and then either exit through a nozzle or return through the export conduit.

A selection device such as a trigger stopper, switch or the like will have first and second positions, in the first position, pulling the trigger of the device squirts water out the nozzle, in the second position, pulling the trigger of the device blows air instead, from a fan located in a plenum/housing, the fan mechanically connected to the turbine and driven thereby when the turbine is powered.

SUMMARY IN REFERENCE TO CLAIMS

It is therefore yet another aspect, advantage, objective and embodiment, in addition to those discussed previously of this invention, to provide a car wash wand comprising:

a handle dimensioned and configured for convenient gripping, the entire device including the handle light enough to be hand carried;

a liquid supply conduit for pressurized liquid;

a liquid nozzle operatively connected to the liquid supply conduit;

a selection device having first and second positions;

a liquid drive device operatively connected to the liquid supply conduit and controlled by the selection device, the liquid drive device unpowered when the selection device is in the first position, the liquid drive device powered by pressurized liquid when the selection device is in the second position;

a fan having at least one fan blade located in a plenum, the fan mechanically connected to the liquid drive device and driven by the liquid drive device when the liquid drive device is powered; and an air nozzle allowing air to escape from the plenum.

It is therefore another aspect, advantage, objective and embodiment of the invention to provide a car wash wand wherein the selection device further comprises:

a trigger having a trigger stopper, such that when the trigger stopper is in the first position, the trigger may be moved from a first trigger position having no liquid flowing to a second trigger position having liquid flowing, and when the trigger stopper is in the second position, the trigger may be moved to a third trigger position, in which liquid flow powers the drive device.

It is therefore yet another aspect, advantage, objective and embodiment of the invention to provide a car wash wand further comprising:

a rod and rod spring, the rod spring urging the trigger into the first trigger position;
a block plug having a first plug position in which liquid flows through the liquid nozzle and a second plug position in which liquid flows to the drive device.

It is therefore another aspect, advantage, objective and embodiment of the invention to provide a car wash wand wherein the liquid drive device further comprises:

a pressure tunnel operatively connected to a pressure chamber having an operative connection to an exit shaft;
a turbine disposed within the pressure chamber such that when pressurized water enters the pressure chamber from the pressure tunnel and exits via the exit shaft, the turbine is powered to operate.

It is therefore yet another aspect, advantage, objective and embodiment of the invention to provide a car wash wand wherein the mechanical connection further comprises:

at least one shaft mechanically connected to rotate with the turbine and mechanically connected to a hub of the fan, whereby when the turbine rotates, the fan rotates.

It is therefore yet another aspect, advantage, objective and embodiment of the invention to provide a car wash wand, wherein the plenum further comprises:

an air inlet.

It is therefore yet another aspect, advantage, objective and embodiment of the invention to provide a car wash wand wherein the air nozzle further comprises a plurality of small apertures.

It is therefore another aspect, advantage, objective and embodiment of the invention to provide an improved car wash wand wherein the improvement comprises:

a fan capable of blowing air.

It is therefore another aspect, advantage, objective and embodiment of the invention to provide an improved car wash wand wherein the fan further comprises:

a turbine mechanically driving the fan, the turbine powered by pressurized water flowing through the car wash wand.

It is therefore another aspect, advantage, objective and embodiment of the invention to provide an improved car wash wand further comprising:

a selection device having a second position in which the fan rotates and a first position in which water jets out of the car wash wand from a liquid nozzle.

INDEX OF REFERENCE NUMERALS

| | |
|---|---|
| Blower tube | 1 |
| Fan housing | 2 |
| Pressure tunnel/gear chamber | 3 |
| Fan propellor | 4 |
| Fan shaft | 5 |

-continued

| | |
|---|---|
| Fan gears | 6 |
| Trigger stop spring | 7 |
| Synchronization rod calibrator/knob | 8 |
| Trigger stop | 9 |
| Gun-style handle | 10 |
| Trigger mechanism | 11 |
| Needle valve | 12 |
| Secondary gear and shaft | 13 |
| Fluid-driven gear | 14 |
| Gear block | 15 |
| Exit shaft | 16 |
| Handle shaft stabilizer bar | 17 |
| Import shaft | 18 |
| Chamber cylinder | 19 |
| Synchronization rod | 20 |
| Dual-junction chamber | 21 |
| Synchronization rod spring | 22 |
| Hose extension | 23 |
| Nozzle head | 101 |
| Apertures | 103 |
| Fan | 105 |
| Fan blade | 107 |
| Handle | 109 |
| Turbine | 111 |
| Drive shaft | 113 |

DETAILED DESCRIPTION

Figure 1:
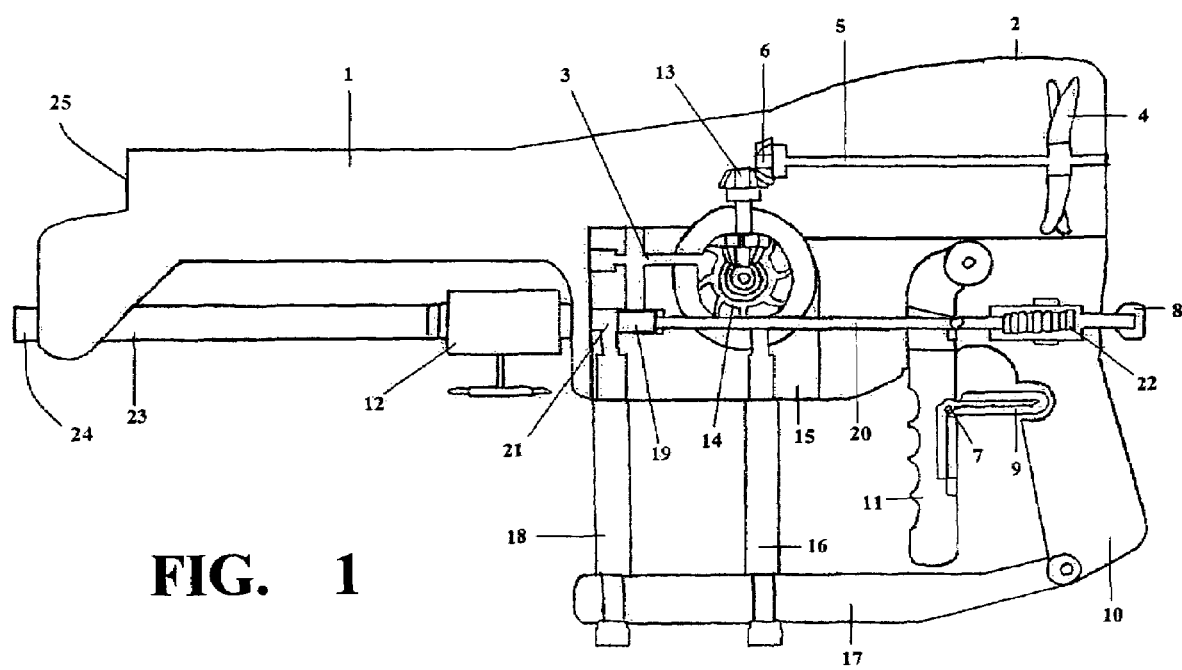
FIG. 1 is a partially transparent side view of a first embodiment of the device, showing details of the structures of the invention.

FIG. 1 is a partially transparent side view of a first embodiment of the device, showing details of the structures of the invention. Gun-style handle 10 allows the device to be easily held in the hand and aimed at the vehicle to clean or dry it. The body of the device includes blower tube 1 projecting from fan housing 2, in which sits fan propeller 4, which rotates upon fan shaft 5. In embodiments in which the turbine and the fan are not coaxial, such as the embodiment of FIG. 1, then fan gears 6 and secondary gear and shaft 13 may allow transmission of the mechanical power from a drive device to the fan. In use, when the fan is activated, the liquid drive device turns shafts which via gears connect to the fan, turning the fan and causing air to enter the plenum/housing 2 via an inlet located at the back, and causing the air to exit via a nozzle at blower tube 1.

Fan 4 is driven by the turbine/gear 14 which sits in turbine/gear block 15 in pressure tunnel/gear chamber 3. This device may function not only as a turbine (a liquid driven mechanical power drive device) but may also be in fact a gear, whose teeth may turn shafts to power the fan, or the shaft of the turbine may power the drive shafts offering mechanical connection to the fan. This may be considered only one example of the pressure drive device of the invention. In use, water is allowed to enter under pressure into the pressure tunnel and via an opening into gear chamber 3, where it hits the blades or cogs of turbine 14, causing it to turn, while the water which has entered may then exit the device via another opening leading to exit shaft 16. Inlet shaft 18 and exit shaft 16 thus allow a complete liquid circuit of water to enter and depart the device. Both may terminate in standard couplings allowing connection of the device to a hose or flexible conduit. Note that when the device is used to squirt water out of a liquid nozzle/pre-existing hose extension 23, then inlet shaft 18 functions but exit shaft 16 need not necessarily be used, as water exits the liquid nozzle. Note also that exit shaft 16 may not necessarily lead to another hose, as the water may possibly, in embodiments, be directed in some tidy direction. However, since this might be hard to arrange, in the presently preferred embodiments and best mode now contemplated, the water may enter a hose connected to exit shaft 16.

Another important portion of the invention is a selection device allowing a user to select whether the wash wand will squirt water, squirt nothing, or blow air.

One embodiment of the selection device is trigger stop 9 having trigger stop spring 7, connected to synchronization rod calibrator/knob 8. This knob may be used to calibrate operation of the device to ensure smooth and leak free operation. In addition, synchronization rod 20 acts to operate the machinery inside the device when the trigger mechanism 11 is activated.

Trigger stop 9 may have two positions: a position in which it prevents trigger 11 from lying against hand grip 10, and a position in which it allows trigger 11 to pass all the way to hand grip 10. By this means, three trigger positions and modes of operation are in turn defined: an "off" or rest or default position, into which spring 22 urges the device when a user does not squeeze the trigger, and also a "water" position in which the rod 20 causes the device to squirt water, and finally an "air" position in which the device blows air. These three positions and functions may be attained using various mechanical variations, and in fact the "off" position may even be eliminated and the device may default to one of the other two positions/modes of operation.

Needle valve 12 may be used to prevent water from exiting via the nozzle when the air blower is activated. In alternative embodiments, valve 12 may be activated by the rod 20.

Handle shaft stabilizer bar 17 allows the inlet and exhaust shafts 16 and 18 to be stabilized and the overall body to be made stronger. Importantly, when a user is employing the device the hoses may move about randomly, and stabilizer bar 17 helps to control such movements.

Chamber cylinder/block plug 19 acts to direct the flow of water: in one of the modes of operation, it prevents water from flowing into the drive device (turbine) while in another mode of operation, it allows such flow, or may in alternative embodiments even act like valve 22 to block flow the other direction, towards the liquid nozzle. Synchronization rod 20, which is controlled by the trigger, may control the positioning and mode of operation of the chamber cylinder and block plug. Dual-junction chamber 21 may allow water to pass out in either of the directions (towards the turbine or towards the nozzle) as dictated by the chamber cylinder.

Figure 2:
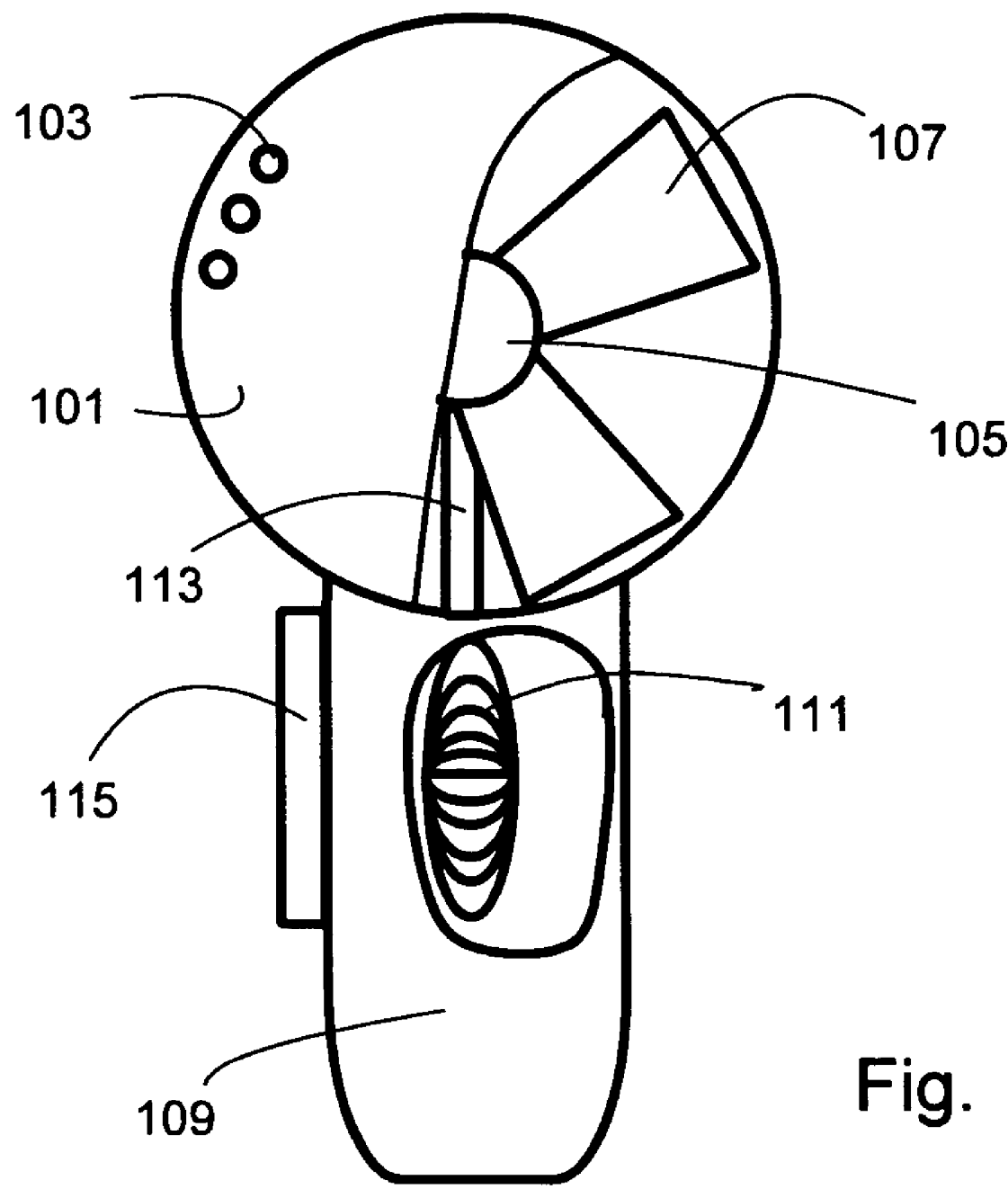
FIG. 2 is a partially cross-sectional front view of a second embodiment of the device, showing a blower head.

FIG. 2 is a partially cross-sectional front view of a second embodiment of the device, showing a blower head.

Nozzle head 101 has apertures 103 through which air may pass, driven by fan 105 having fan blade 107.

Handle 109 may be used to hold the device while in use, and may have trigger 115 thereon. Note that this arrangement and alternative embodiment of the device may look completely different from the previous embodiment, but it is in fact the same invention having a different appearance. Turbine 111 may drive, indirectly or directly, drive shaft 113.

It will be understood that the inventor does not limit himself to a single embodiment of the invention, and examples are provided.

Figure 3:
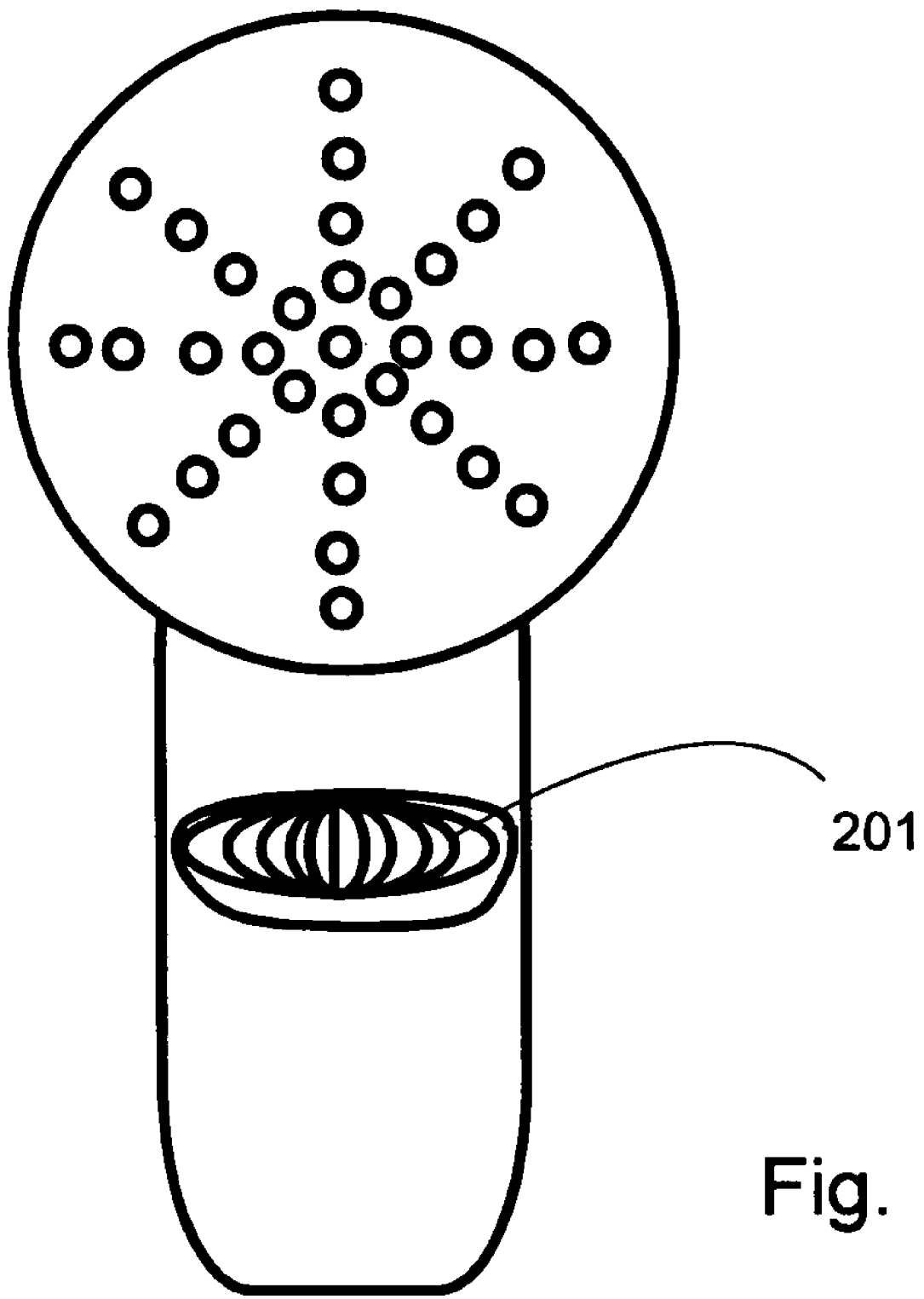

FIG. 3 is a partially cross-sectional front view of a second embodiment of the device, showing an alternative arrangement of the liquid powered drive device. In this embodiment, turbine 201 may be arranged differently from previous embodiments, horizontally rather than vertically, but the invention remains within the scope of the original claims.

Figure 4:
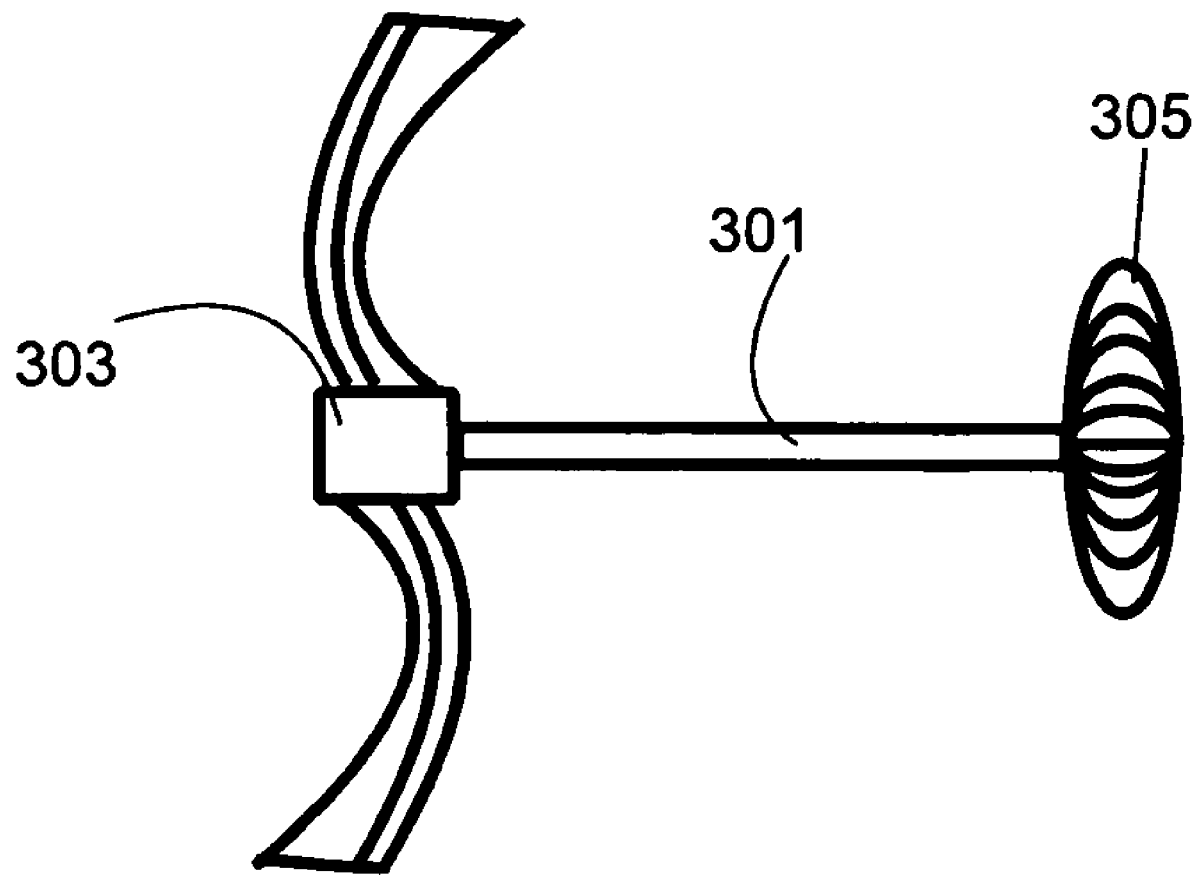

FIG. 4 is a side view of one possible device in which the fan 303 and turbine 305 share a co-axial shaft 301, thus eliminating moving parts at the expense of requiring a long liquid conduit path to get the pressurized water up that high, and at the further expense of possibly impeding the air flow.

Thus, it will be understood that the original invention includes many alternatives and equivalents in terms of mechanical operation.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A car wash wand comprising:
   a handle dimensioned and configured for convenient gripping, the entire device including the handle light enough to be hand carried;
   a liquid supply conduit for pressurized liquid;
   a liquid nozzle operatively connected to the liquid supply conduit;
   a selection device having first and second positions;
   a liquid drive device operatively connected to the liquid supply conduit and controlled by the selection device, the liquid drive device unpowered when the selection device is in the first position, the liquid drive device powered by pressurized liquid when the selection device is in the second position;
   a fan having at least one fan blade located in a plenum, the fan mechanically connected to the liquid drive device and driven by the liquid drive device when the liquid drive device is powered; and
   an air nozzle allowing air to escape from the plenum.

2. The car wash wand of claim 1, wherein the selection device further comprises:
   a trigger having a trigger stopper, such that when the trigger stopper is in the first position, the trigger may be moved from a first trigger position having no liquid flowing to a second trigger position having liquid flowing, and when the trigger stopper is in the second position, the trigger may be moved to a third trigger position, in which liquid flow powers the drive device.

3. The car wash wand of claim 2, further comprising:
   a rod and rod spring, the rod spring urging the trigger into the first trigger position;
   a block plug having a first plug position in which liquid flows through the liquid nozzle and a second plug position in which liquid flows to the drive device.

4. The car wash wand of claim 1, wherein the liquid drive device further comprises:
   a pressure tunnel operatively connected to a pressure chamber having an operative connection to an exit shaft;
   a turbine disposed within the pressure chamber such that when pressurized water enters the pressure chamber from the pressure tunnel and exits via the exit shaft, the turbine is powered to operate.

5. The car wash wand of claim 4, wherein the mechanical connection further comprises:
   at least one shaft mechanically connected to rotate with the turbine and mechanically connected to a hub of the fan, whereby when the turbine rotates, the fan rotates.

6. The car wash wand of claim of 5, wherein the plenum further comprises:
   an air inlet.

7. The car wash wand of claim 1, wherein the air nozzle further comprises a plurality of small apertures.

* * * * *